(12) United States Patent
Lloyd-Jones et al.

(10) Patent No.: US 7,073,128 B2
(45) Date of Patent: Jul. 4, 2006

(54) VIDEO BROWSER DATA MAGNIFIER

(75) Inventors: Daniel John Lloyd-Jones, Northbridge (AU); Julie Rae Kowald, Newport (AU)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 09/769,468

(22) Filed: Jan. 26, 2001

(65) Prior Publication Data
US 2001/0033302 A1    Oct. 25, 2001

(30) Foreign Application Priority Data
Jan. 31, 2000    (AU) .................................... PQ5351

(51) Int. Cl.
*G06F 3/00* (2006.01)
*G11B 27/00* (2006.01)

(52) U.S. Cl. ...................... 715/720; 715/721; 715/722; 715/723; 715/730

(58) Field of Classification Search ................ 345/716, 345/719, 720, 721, 723, 730, 731, 732, 853, 345/718, 717, 722, 724, 725
See application file for complete search history.

(56) References Cited

U.S. PATENT DOCUMENTS

| | | | | |
|---|---|---|---|---|
| 5,532,833 A | * | 7/1996 | Hong et al. | 386/77 |
| 5,821,945 A | * | 10/1998 | Yeo et al. | 345/440 |
| 5,907,704 A | * | 5/1999 | Gudmundson et al. | 717/100 |
| 5,995,095 A | * | 11/1999 | Ratakonda | 715/500.1 |
| 6,119,123 A | * | 9/2000 | Elenbaas et al. | 707/102 |
| 6,154,601 A | * | 11/2000 | Yaegashi et al. | 386/52 |
| 6,236,395 B1 | * | 5/2001 | Sezan et al. | 715/723 |
| 6,278,446 B1 | * | 8/2001 | Liou et al. | 345/700 |
| 6,327,420 B1 | * | 12/2001 | Furukawa | 386/52 |
| 6,369,837 B1 | * | 4/2002 | Schirmer | 345/764 |

(Continued)

FOREIGN PATENT DOCUMENTS

AU    2001 110040 A1    8/2001

(Continued)

OTHER PUBLICATIONS

Lee, et al., "User Interface Issues for Browsing Digital Video," 21st BCS IRSG Colloquium on IR, Glasgow, Apr. 19-20, 1999.

(Continued)

*Primary Examiner*—Ba Huynh
(74) *Attorney, Agent, or Firm*—Fitzpatrick, Cella, Harper & Scinto (57) ABSTRACT

A method of conceptually magnifying video browser data, the data being organised hierarchically in one or more levels (304, 312) is disclosed. The method comprises firstly selecting a parent level (304), the parent level selection making visible a first key frame (340) associated with the parent level (304). A magnification mode is also selected, being either a parent-only, or a parent-children magnification mode. Conceptual magnification is then performed, which displays, in the parent-only mode, the first key frame (340) associated with the parent level (304), and other frames (300, 302) which are also associated with the parent level. The conceptual magnification displays, in the parent-children mode, the first key frame (340) associated with the parent level (304), and second key frames (324) associated with an associated child level (312).

12 Claims, 7 Drawing Sheets

U.S. PATENT DOCUMENTS

| | | | |
|---|---|---|---|
| 6,448,987 B1 * | 9/2002 | Easty et al. | 345/834 |
| 6,463,444 B1 * | 10/2002 | Jain et al. | 707/104.1 |
| 6,484,190 B1 * | 11/2002 | Cordes et al. | 715/514 |
| 6,487,360 B1 * | 11/2002 | Sumiyoshi et al. | 386/52 |
| 6,526,215 B1 * | 2/2003 | Hirai et al. | 386/52 |
| 6,549,219 B1 * | 4/2003 | Selker | 345/834 |
| 6,580,437 B1 * | 6/2003 | Liou et al. | 345/719 |
| 6,606,105 B1 * | 8/2003 | Quartetti | 345/853 |
| 6,633,308 B1 * | 10/2003 | Ono et al. | 715/723 |
| 6,741,977 B1 * | 5/2004 | Nagaya et al. | 707/1 |
| 2001/0056460 A1 * | 12/2001 | Sahota et al. | 709/201 |
| 2005/0028194 A1 * | 2/2005 | Elenbaas et al. | 725/32 |

FOREIGN PATENT DOCUMENTS

| | | |
|---|---|---|
| EP | 0 917 148 | 5/1999 |
| EP | 0 917 148 A2 | 5/1999 |
| WO | 99/32993 | 7/1999 |
| WO | WO 99/32993 A1 | 7/1999 |

OTHER PUBLICATIONS

Annual Colloquim on IR Research, Glasgow, UK, Apr. 19-20, 1999 by Lee H., Smeaton A. and Furner J., "User Interface Issues for Browsing Digital Video". pp. 1-11.

* cited by examiner

VIDEO BROWSER DATA MAGNIFIER

TECHNICAL FIELD OF THE INVENTION

The present invention relates generally to the display of video data, and to data browsers in particular. The invention also relates to a computer program product including a computer readable medium having recorded thereon a computer program for browsing video data in accordance with the disclosed inventive concept.

BACKGROUND ART

The sheer volume of data associated with video sources presents a challenge to it's utility. If desired material cannot easily and simply be searched for, and/or if data of interest cannot be identified by browsing through material, then the accumulated video data becomes much less useful than it might be.

A key problem with present browsers is complexity, browsers typically involving numerous menus, options, icons and complex graphical user interfaces. This is a direct consequence of the amount of information that is associated with video data. The aforementioned complexity limits the practical utility of such browsers.

DISCLOSURE OF THE INVENTION

It is an object of the present invention to substantially overcome, or at least ameliorate, one or more disadvantages of existing arrangements.

According to a first aspect of the invention, there is provided a method of conceptually magnifying video browser data, said data being organised hierarchically in one or more levels, the method comprising the steps of:

selecting a parent level, said parent level selection making visible a first key frame associated with said parent level;

choosing one of a parent-only and a parent-children magnification mode; and performing conceptual magnification; said conceptual magnification displaying, in the parent-only mode, the first key frame associated with said parent level and other frames which are also associated with said parent level; and said conceptual magnification displaying, in the parent-children mode, the fist key frame associated with said parent level and second key frames associated with an associated children level.

According to a second aspect of the invention, there is provided an apparatus for conceptually magnifying video browser data, said data being organised hierarchically in one or more levels, the apparatus comprising:

parent level selection means for selecting a parent level, said parent level selection making visible a first key frame associated with said parent level;

magnification mode selection means for choosing one of a parent-only and a parent-children magnification mode;

conceptual magnification means for performing conceptual magnification; and display means, for displaying, in the parent-only mode, the first key frame associated with said parent level and other frames which are also associated with said parent level; and for displaying, in the parent-children mode, the first key frame associated with said parent level and second key frames associated with an associated children level.

According to another aspect of the invention there is provided a computer program product comprising a computer program for apparatus for conceptually magnifying video browser data, said data being organised hierarchically in one or more levels, the program comprising:

code for a selecting step for selecting a parent level, said parent level selection making visible a first key frame associated with said parent level;

code for a magnification mode selection step for choosing one of a parent-only and a parent-children magnification mode; and code for a conceptual magnification step for performing conceptual magnification; said conceptual magnification displaying, in the parent-only mode, the first key frame associated with said parent level and other frames which are also associated with said parent level; and said conceptual magnification displaying, in the parent-children mode, the first key frame associated with said parent level and second key frames associated with an associated children level.

The present invention ameliorates the problem of complicated interfaces which overload the user with information by providing a simplified interface which permits the user to browse the video, providing only the information necessary to search and identify particular portions of the video. Information related to the video is abstracted and initially hidden from the user, allowing the user to "drill down" to this data at will.

BRIEF DESCRIPTION OF THE DRAWINGS

A number of preferred embodiments of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

The proud owner of a digital video camera soon accumulates a large number of video tapes, and the issue arises of how to store and access the video data. As with any data storage and retrieval situation, the manner in which data is stored and the extent to which it is accessible determines its utility, and the extent to which it can be used and enjoyed.

Figure 1:
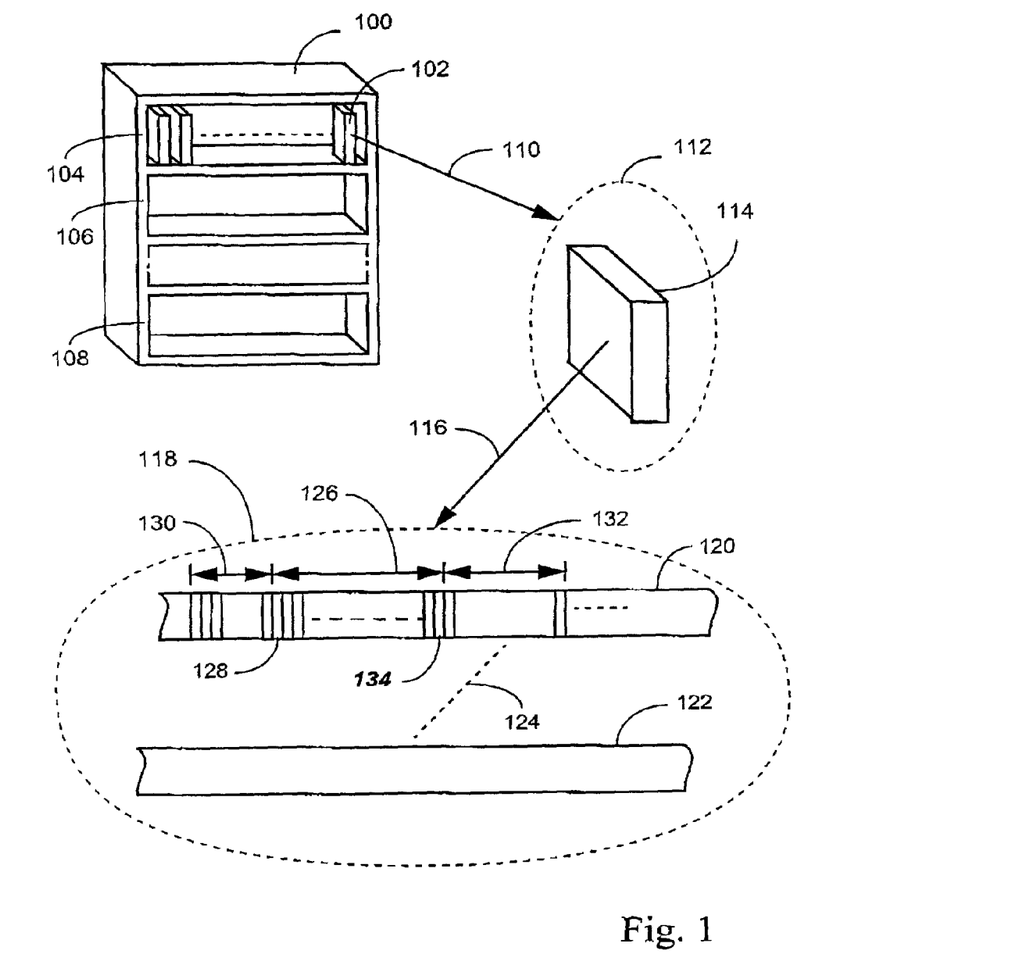
FIG. 1 depicts an arrangement for organisation of video data.

FIG. 1 depicts how video information stored in video cassettes 102 are physically stored on a set of shelves 100. Each shelf 104, 106, . . . , 108 is assigned to a different area of interest. Accordingly, the first shelf 104 is in the present case allocated to "holidays", the second shelf 106 is dedicated to "sports", . . . , and the bottom shelf 108 is relegated to "miscellaneous" and other unclassifiable type of material.

Having considered the entire collection of individual video cassettes, each individual cassette is now considered, and in order to set the scene for so doing, the cassette 102 is depicted, as depicted by an arrow 110, in an inset 112, in a somewhat larger representation 114. The individual video cassette 114, or rather the contents thereof, can be depicted as indicated by an arrow 116 as a series of scenes 120, . . . , 122, these scenes being shown in an inset 118. The terms "shelf" and "section" are used interchangeably throughout the description, and have the same meaning unless dictated otherwise by context. Similarly, the terms "tape" and "cassette" are similarly used interchangeably.

Each scene, e.g. 120, is composed of a sequence of individual video clips as depicted by arrows 130, 126, and 132 Each clip, e.g. 126, is similarly composed of a sequence of individual video frames 128, . . . , 134. Accordingly, the video information is arranged in a hierarchical structure, commencing at the highest level with the entire collection housed in the set of shelves 100, the shelves comprising a series of individual shelves or sections 104, 106, . . . , 108, each section 104 comprising individual cassettes or tapes 102, 114, each tape 114 comprising a sequence or set of scenes 120, 122, each scene consisting of a sequence of clips 126, and finally each clip 126 comprising a sequence of individual frames 128.

Figure 2:
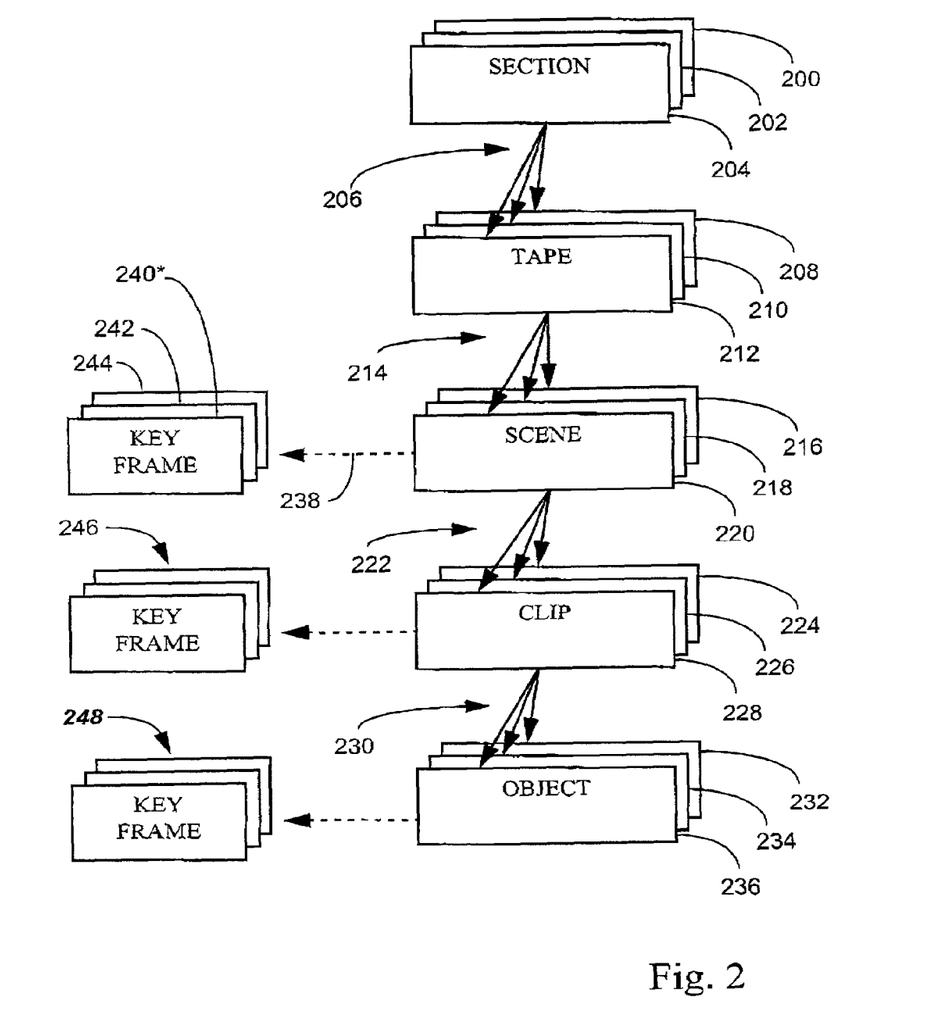
FIG. 2 illustrates a hierarchical organisation of video data in accordance with a preferred embodiment of the invention.

FIG. 2 shows an abstraction of the physical picture presented in FIG. 1 Accordingly, at the highest level, a number of sections 200, 202, 204 represent the shelves 104 described in relation to FIG. 1. Each section 204 comprises, as depicted by a set of arrows 206, of a number of individual tapes 208, 210, and 212. Furthermore, each individual tape 212, comprises, as indicated by a set of arrows 214, a number of scenes 216, 218, and 220. Associated with each scene 220, as depicted by a dashed arrow 238, is a set of key frames 240, 242, and 244, of which one particular key frame 240 is a "principal key frame", this being indicated by the asterisk on the right hand side of the reference numeral. Each scene 220, comprises, as depicted by a set of arrows 222, a number of clips 224, 226, and 228. Each clip 228 is associated with a set of key frames 246, one of which key frames is again a principal key frame. Each clip 228, comprises, as indicated by a set of arrows 230, a number of objects 232, 234, and 236. The term "object" relates to a specific feature in a set of video frames, the feature being of particular interest to the user. Typically, an object is a bound pixel region which is determined using an appropriate image processing algorithm, noting that the object can occur either within a single frame, or alternately, in a series of frames. As an example of the latter case, ie an object appearing in a series of frames, a video scene taken at all airport when meeting a family member returning from holiday is considered. In particular, a video clip is considered in which the arriving aircraft enters the video camera's field of view, remains there while it travels from left to right across the field of view, and then exits the field of view. This clip can be characterized in terms of an object (i.e., the aeroplane in this instance) during the time the plane crosses the field of view Associated with the particular object 236 is a set of key frames 248, one of which is a principal key frame.

Figure 3:
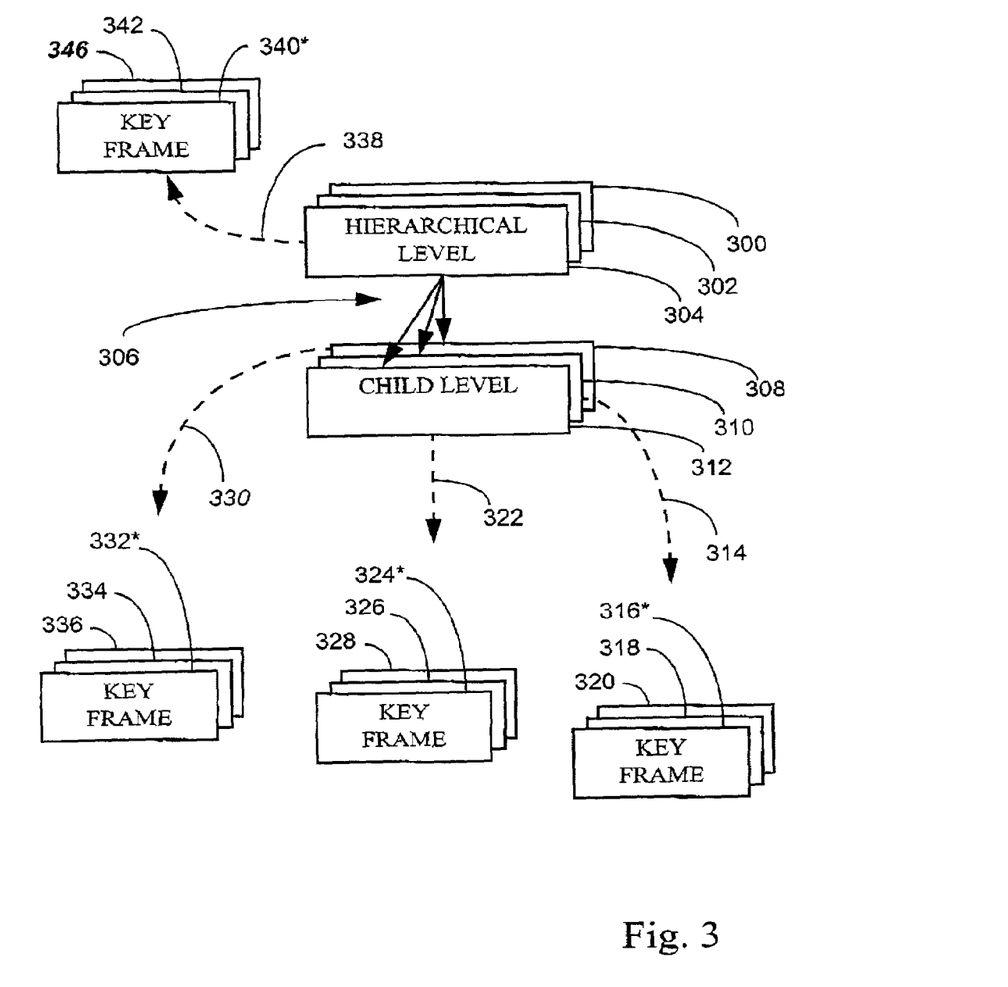
FIG. 3 shows a parent/child relationship in relation to FIG. 2.

FIG. 3 provides a "parent/children" generic representation of two levels in the data organisation hierarchy. Items 300, 302, and 304 are shown to be on the same hierarchical level. Associated with an item 304, as indicated by a dashed arrow 338, is a set of frames 340, 342 and 346, the frame 340 being a key frame as indicated by the asterisk. The parent item 304 is associated, as indicated by a set of arrows 306, with a child "hierarchical level", comprising items 308, 310 and 312.

Each of the aforementioned items is associated, as indicated by dashed arrows 330, 314 and 322, with a set of representative frames. For example, item 312 is associated with the set of frames 324, 326 and 328, where frame 324 is a key frame as indicated by the asterisk. The term "key frame" is utilised throughout the description to indicate a frame which is particularly representative of the item with which it is associated.

Reviewing the description presented in relation to FIGS. 1 through 3, it is noted that (i) video data is organised in a hierarchical structure with a number of levels, (ii) each level comprises a number of items, where each item is associated with one or more key frames, one of which is a principal key frame, and (iii) each key frame associated with a particular item on a hierarchical level is representative of that item, noting that the principal key frame is "most" representative, this being judged according to some criterion.

Figure 4:
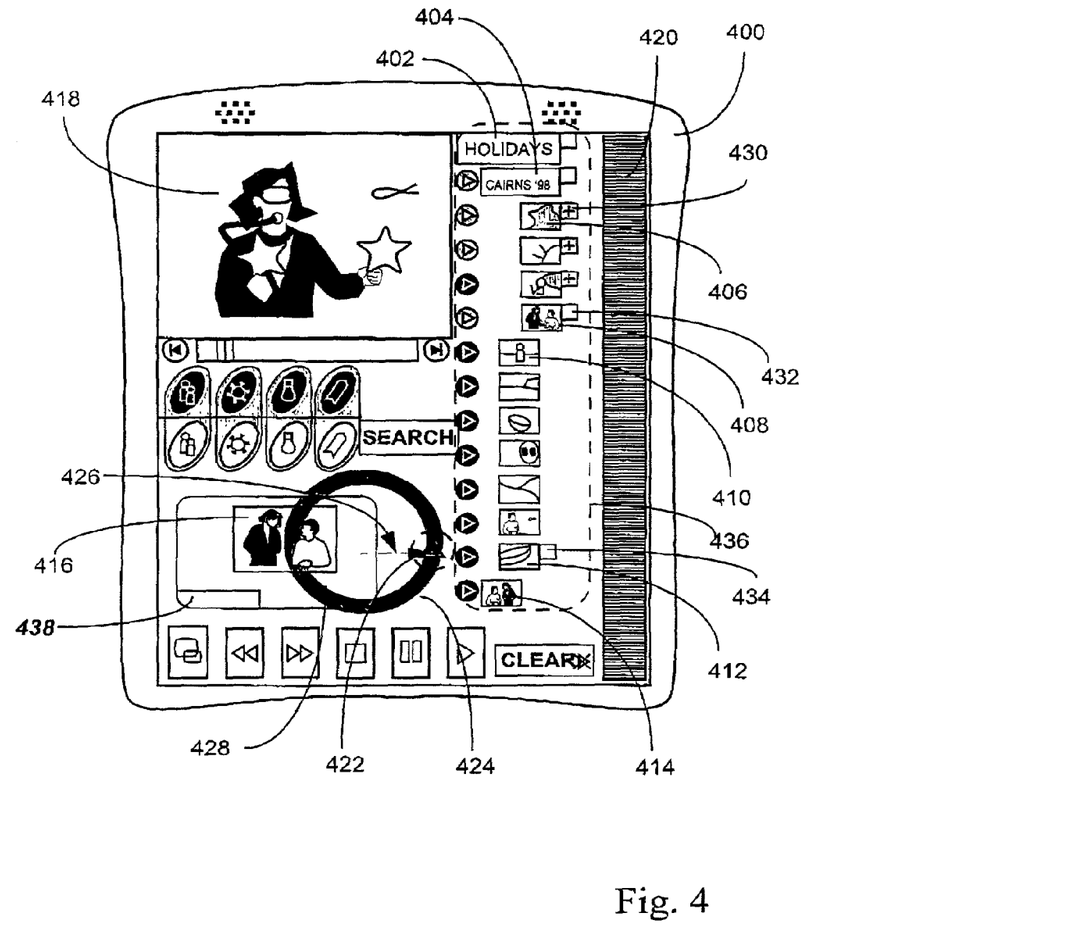
FIG. 4 depicts a browser user interface associated with the preferred embodiment.

FIG. 4 shows a graphical user interface (GUI) associated with a preferred embodiment of the invention. The embodiment conceptually "magnifies" the tree structure on a number of different levels:

1. Physically it magnifies, based on user selection, the actual keyframe images that appear in the right hand side scrolling device tree structure area (as depicted in the dashed boundary 436), as well as the actual GUI in that area 436. This allows the user to see the actual content more clearly as the keyframes in the tree structure are quite small. Magnification of the GUI in the area assists in providing continuity of context for the user, enabling him or her to intuitively grasp the relationship between the unmagnified keyframe and the magnified keyframe.

2. Magnifies hidden content—by visually flagging the presence of collapsed content in unexpanded scenes (i.e. shows the user via visual "+" symbols on the unexpanded keyframes that clips are hidden in scenes that are not expanded.)

3. Magnified the data hidden in video footage by showing the multiple keyframes of clips or objects in the selected scenes.

Figure 5:
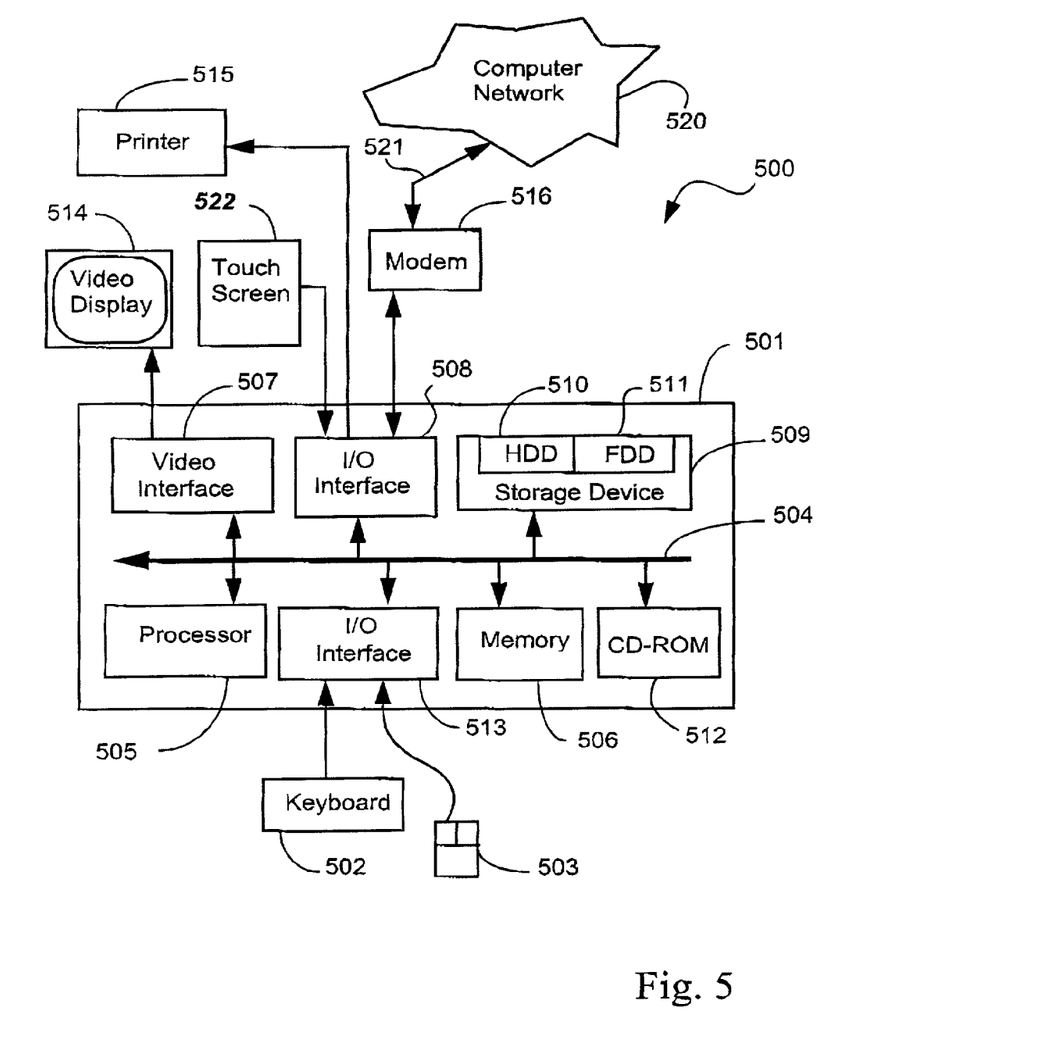
FIG. 5 is a schematic block diagram of a general purpose computer upon which the preferred embodiment of the present invention can be practiced.

The GUI is being displayed on a personal computer (PC) 500 (see FIG. 5). When a term "selection" or "selected" is used hereinafter, it is to be understood that this is performed using one or more of a mouse 503 (see FIG. 5), selected key strokes on a keyboard 502, positioning of a GUI pointer 422 and positioning of a scrolling device 406. The GUI is presented in an attractive frame 400, and the hierarchical organisation of information is presented on the right-hand side of the frame. The tree structure has 5 visible levels (refer to Table below and FIG. 4)

| | |
|---|---|
| Section | A video category assigned by the home user, for example Holidays in FIG. 4. |
| Tape | Video footage taken from a single tape. Appear as children of the Section. For example Cairns 98 in FIG. 4. |
| Scene | A sequence of clips taken within a short time period. Appear as children of a Tape. The right-most vertically aligned channel of keyframes in FIG. 4. |
| Clip | A sequence of consecutive video frames between a record start and record stop marker on a DV tape. Clips are in the middle vertically aligned channel and appear as children of a scene. |
| Object | A sequence of consecutive video frames that track on objects movement. The frames are from the parent's video footage, thus objects are a subset of their parental clip. Objects are in the left-most vertically aligned channel and appear as children of a clip. The only object in FIG. 4 appears in the data magnifier. (a frame of 3 scuba divers) |

The hierarchy can be expanded and collapsed by selecting the expander boxes 430 on the right of a tree item. A '+' in an expander box signifies that there is lower level hierarchy content hidden (collapsed/not expanded). Whereas, an empty box signifies that the current level is expanded and its immediate children are visible.

Clips and Objects relate to specific video entities, whereas the other levels can be considered as groupings of clips/objects that provide structure and temporal location, although these latter levels can also be played.

Accordingly, at the highest hierarchical level, the selected section is that of "holidays" as depicted by the reference numeral 402. The selected child 404 associated with the section 402 is identified as "Cairns '98", which represents a tape (e.g., 102 in FIG. 1) which has been classified in the holidays section. Within the tape 404, there are a number of scenes 406, . . . , 408. The scene 406 displays a small square 430 with a "+" at its top right hand corner, this "+" indicating that "child" information is "hidden" within the scene 406 but is not displayed on the GUI. In contrast, the scene 408 shows an empty square 432 at its top right hand corner, this indicating that the child information contained within the scene 408 is displayed on the GUI as clips 410, . . . , 412. In a similar fashion, the final clip 412 displays an empty box 434 at its top right hand corner, indicating that its child, i.e., the "object" residing within the clip, is displayed in the GUI as object 414 displayed in the GUI.

The particular representation of the hierarchical information ranging from the holiday section 402 down to the object 414 is a convenient arrangement which allows the user of the GUI to select a particular hierarchical level for "conceptual magnification".

Selection of the desired hierarchical level can be performed with the pointer 422 (by using the mouse 503 etc. as already described). This pointer is arranged to "travel" on a circular track 424, in a manner dictated by the "invisible" radius 426, directed by the user appropriately "clicking and dragging" the pointer 422 using the mouse 503. When the user adjusts the radial orientation of the pointer 422, this adjustment, which changes the radial orientation of the pointer 422 relative to the representations of the hierarchical data 402, 404, . . . , points to, and thus selects the hierarchical data item (402, 404, . . . ) which most closely intersects the extended radial line 426 in the chosen orientation. In other words, the user is able to select a desired hierarchical level by radial adjustment of the pointer 422. Having selected the desired item, the embodiment automatically presents a frame representative of the selected hierarchical level, in conjunction with frames representative of the child hierarchical level. Such representative frames can be "key" frames, ie those frames designated by some process as being particularly representative. Alternatively, some other mechanism for determining representative frames can be used. To continue therefore, if the user selects the scene 408, then a representative frame (eg a key frame) for the scene 408 will be displayed, in conjunction with representative frames (eg key frames) for each of the child clips 410, . . . 412. The user is able to conceptually magnify, i.e., to "drill down", into the scene 408, and to view representative frames for the individual clips 410, . . . , 412, which make up the scene 408. This conceptual magnification is performed simply, and in an intuitive manner, making the browsing of video content practical and convenient, even when applied in relation to large amounts of video data.

The aforementioned representative frames are displayed in the display area 428 The manner of presentation is to display a magnified version 416 of the hierarchical level, or "parent" scene 408, for, say six seconds, and then to display magnified versions of the representative frames associated with the clips 410, . . . , 412 for two seconds each. In the display area 428 the magnified version 416 of the keyframe 408 is visible, as well as a fragment 438 of the clip 410. The frames are looped (i.e., animated) in a "trough and left" trajectory on the screen 428, and a transition, for example a cross fade, is used between frames. When the display loop returns to the first (i.e., primary) key frame, the sequence is started again. The reason for leaving the primary key frame on the screen for six second and the others for only two seconds, is to maintain a contextual stability, so that the user does not lose the association between the hierarchical data structure displayed on the GUI, and the content in the magnifier screen 428. By leaving the primary key frame on for a longer duration than the other frames, the user can see that it matches back to the data structure on the GUI.

Noting that the hierarchical data structure can be longer than the size of the GUI frame 400, a scrolling device 420 is provided. By "dragging" the scrolling device 420 up, or down using the mouse 503, the hierarchical data structure items (402, 404, . . . ) are linearly translated in a corresponding direction (i.e., up, or down in accordance with the direction in which the scrolling device is dragged), moving the hierarchical data items past the pointer 422. Accordingly, selection of a data item can be effected by adjustment of the pointer 422 and/or the scrolling device 420.

In accordance with a second embodiment, instead of conceptually magnifying a representative frame of the parent hierarchical level, in conjunction with representative frames of all the associated child levels, it is possible to view representative frames from all items on the same hierarchical level (e.g. 300, . . . , 304 in FIG. 3). This option can be selected at any level by the user. In addition, upon reaching the "bottom" of the hierarchical data structure, since the bottom level has no children, representative frames from all items on the same hierarchical level are automatically conceptually magnified, ie viewed.

Figure 6:
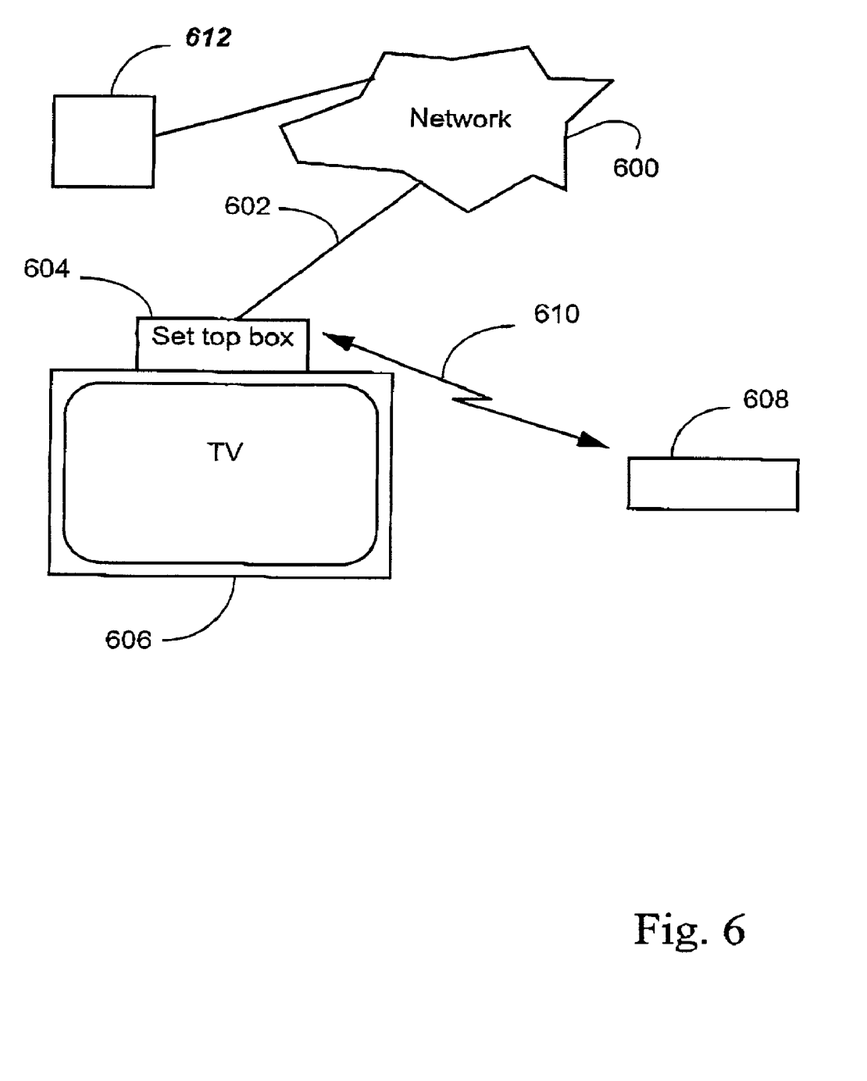
FIG. 6 shows another embodiment based upon a hand-held wireless configuration.

The method of conceptually magnifying video browser data can be practiced using a conventional general-purpose computer system 500, such as that shown in FIG. 5 wherein the processes of FIG. 6 may be implemented as software, such as an application program executing within the computer system 500. In particular, the steps of the method of conceptually magnifying video browser data arc effected by instructions in the software that are carried out by the computer. The software may be divided into two separate parts, one part for carrying out the browsing magnification methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for conceptually magnifying video browser data in accordance with the embodiments of the invention.

The computer system 500 comprises a computer module 501, input devices such as a keyboard 502 and mouse 503, output devices including a printer 515 and a display device 514. The display device 514 can be provided with an associated touch screen 522, which provides an additional user interface. The GUI described in relation to FIG. 4 can be displayed on the display 514, and associated control functions can be activated using the touch screen 522. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, and other network systems, such as a Local Area Network (LAN) or a Wide Area Network (WAN).

The computer module 501 typically includes at least one processor unit 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and an interface 508 for the modem 516. A storage device 509 is provided and typically includes a hard disk drive 510 and a floppy disk drive 511. A magnetic tape drive (not illustrated) may also be used. A CD-ROM drive 512 is typically provided as a non-volatile source of data. The components 505 to 513 of the computer module 501, typically communicate via an interconnected bus 504 and in a manner which results in a conventional mode of operation of the computer system 500 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 510 and read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable medium including magnetic tape, a ROM or integrated circuit, a magneto-optical disk, a radio or infra-red transmission channel between the computer module 501 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

The method of conceptually magnifying video browser data may alternatively be implemented in dedicated hardware such as one or more integrated circuits performing the functions or sub functions of browser conceptual magnification. Such dedicated hardware may include graphic processors, digital signal processors, or one or more microprocessors and associated memories.

Turning to FIG. 6, an alternate embodiment is shown, comprising a portable hand-held device 608 which communicates using wireless transmission 610. The hand-held device 608 physically incorporates display and control functionality equivalent to that described in relation to the GUI in FIG. 4. Communication is established between the hand-held device 608 and a set top box 604, the latter being associated with a cable TV 606, where the set top box is connected to a network 600. Video image data on a remote server 612 which is connected to the network 600 can accordingly be accessed and browsed using the hand-held device 608.

Figure 7:
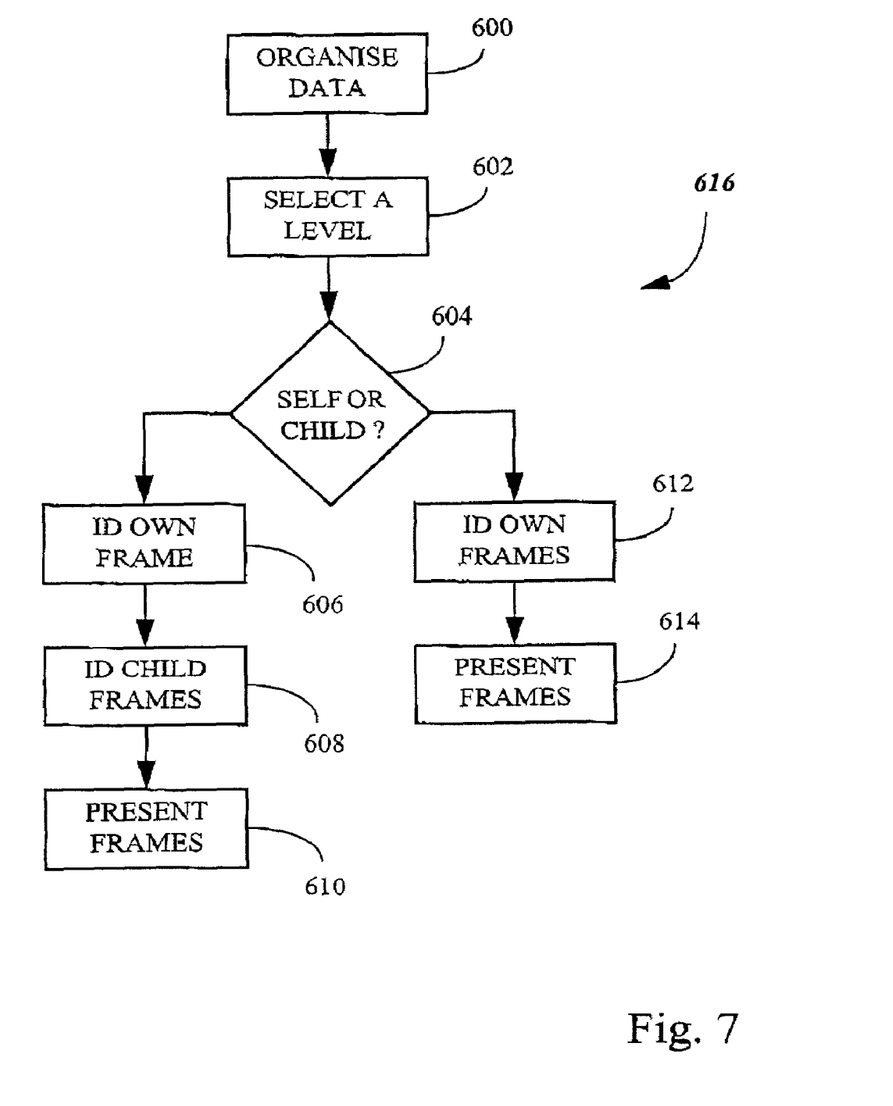
FIG. 7 shows a process flow diagram for the preferred embodiment.

FIG. 7 shows a process flow diagram for the contextual magnification process 616 of the preferred embodiments. In a first process 600, the hierarchical data is organised in a hierarchical structure. This step is typically performed "off-line", and while it is described as part of the process 616, this is for ease of understanding only. Thereafter, the user selects a hierarchical level for conceptual magnification in a process 602. Following thereon, in a decision process 604, a selection is made as to whether to view child frames in association with a parent frames, or alternatively, frames only from the parent level. In the former instance, the overall process is directed to a sub-process 606 where a representative frame for the parent is identified, this being a principle key frame, or a frame selected using another criterion. Thereafter, representative frames (eg key frames) are selected, or identified, for the associated child items, whereafter, the selected frames are presented in a cyclical fashion in the magnifier display 428 (see FIG. 4).

Alternatively, if the conceptual magnification is desired at the parent hierarchical level only, the overall process is directed to a sub-process 612. In 612, representative frames from the parent level are selected, these being key frames, or frames selected using another criterion. Thereafter, the selected frames are presented in a sub-process 614.

INDUSTRIAL APPLICABILITY

It is apparent from the above that the embodiments of the invention are applicable to the multi-media data processing industries.

The foregoing describes only some embodiments of the present invention, and modifications and/or changes can be made thereto without departing from the scope and spirit of the invention, the embodiments being illustrative and not restrictive.

The invention claimed is:

1. A method of presenting, in a display, video browser data, said data being organized hierarchically in one or more levels, each of such levels including multiple frames including a key frame, the method comprising the steps of:

selecting a parent level, said parent level selection displaying, in a first display area, a key frame associated with said parent level;

choosing one of a parent-only and a parent-children magnification mode;

if the parent-only mode is chosen, displaying in a second display area, in magnified form relative to the key frame displayed in the first display area, the key frame associated with said parent level and other key frames which are also associated with said parent level; and if the parent-children mode is chosen, displaying in said second display area, in magnified form relative to the key frame displayed in the first display area, the key frame associated with the parent level and key frames associated with child levels associated with the parent level.

2. The method of claim 1, wherein in relation to the parent only-mode, said step of displaying further comprises indicating presence of undisplayed data associated with the key frame and the other key frames associated with the parent level, and wherein in relation to the parent-children mode, said step of displaying further comprises indicating presence of undisplayed data associated with the key frame associated with the parent level and the key frames associated with the child levels.

3. The method of claim 1, wherein in the parent-only mode, said displaying step comprises sub-steps of:
- automatically displaying the key frame associated with said parent level for a first time interval; and
- automatically displaying the other key frames which are also associated with said parent level for a second time interval,
- and wherein in the parent-children mode, said displaying step comprises sub-steps of:
- automatically displaying the key frame associated with said parent level for a third time interval; and
- automatically displaying said key frames associated with said associated child levels for a fourth time interval.

4. The method of claim 1, wherein said key frames comprise one or more of text and image data.

5. An apparatus for presenting, in a display, video browser data, said data being organized hierarchically in one or more levels, each of such levels including multiple frames including a key frame, the apparatus comprising:
- parent level selection means for selecting a parent level, said parent level selection displaying, in a first display area, a key frame associated with said parent level;
- magnification mode selection means for choosing one of a parent-only and a parent-children magnification mode;
- means for displaying in a second display area, if the parent-only mode is chosen, in magnified form relative to the key frame displayed in the first area, said key frame associated with said parent level and other key frames which are also associated with said parent level; and
- means for displaying in said second display area, if the parent-children mode is chosen, in magnified form relative to the key frame displayed in the first area, said key frame associated with said parent level and key frames associated with child levels associated with the parent level.

6. The apparatus of claim 5,
- wherein, in relation to the parent-only mode, said means for displaying is adapted for indicating presence of undisplayed data associated with the key frame and the other key frames associated with the parent level;
- and wherein in relation to the parent-children mode, said means for displaying is adapted for indicating presence of undisplayed data associated with the key frame associated with the parent level and the key frames associated with the child levels.

7. The apparatus of claim 5, wherein representations of the hierarchically organized video data levels are spatially disposed in relation to selection means, which selection means comprises a radially adjustable pointer whose radial orientation relative to the representations is indicative of the hierarchical level to be selected.

8. The apparatus of claim 7, further comprising an adjustable scrolling means which is adapted, in response to an adjustment of said adjustable scrolling means, to linearly translate the representations of the hierarchically organized video data levels in relation to the selection means, thereby effecting a change in the radial orientation of the selection means relative to the representations, said changed radial orientation relative to the representations being indicative of the hierarchical level to be selected.

9. A computer-readable medium having a computer-executable program stored thereon, the program for directing an apparatus for presenting, in a display, video browser data, said data being organized hierarchically in one or more levels, each of such levels including multiple frames including a key frame, the program comprising:
- code for selecting a parent level and for displaying, in a first display area, a key frame associated with said parent level;
- code for choosing one of a parent-only and a parent-children magnification mode;
- code for displaying in a second display area, if the parent-only mode is chosen, in magnified form relative to the key frame displayed in the first area, said key frame associated with said parent level and other key frames which are also associated with said parent level; and
- code for displaying in said second display area, if the parent-children mode is chosen, in magnified form relative to the key frame displayed in the first area, said key frame associated with said parent level and key frames associated with child levels associated with the parent level.

10. The computer-readable medium of claim 9,
- wherein in relation to the parent-only mode, said code for displaying comprises code for indicating presence of undisplayed data associated with the key frame and the other key frames associated with the parent level,
- and wherein in relation to the parent-children mode, said code for displaying comprises code for indicating presence of undisplayed data associated with the key frame associated with the parent level and the key frames associated with the child levels.

11. The computer-readable medium of claim 9, wherein in relation to the parent-only mode, said code for displaying comprises code for:
- automatically displaying the key frame associated with said parent level for a first time interval; and
- automatically displaying the other key frames which are also associated with said parent level for a second time interval,
- and wherein in relation to the parent-children mode, said code for displaying comprises code for:
- automatically displaying the first key frame associated with said parent level for a third time interval; and
- automatically displaying said key frames associated with said associated child levels for a fourth time interval.

12. The computer-readable medium of claim 9, wherein said key frames comprise one or more of text and image data.

* * * * *

UNITED STATES PATENT AND TRADEMARK OFFICE
CERTIFICATE OF CORRECTION

| | | |
|---|---|---|
| PATENT NO. | : 7,073,128 B2 | |
| APPLICATION NO. | : 09/769468 | |
| DATED | : July 4, 2006 | |
| INVENTOR(S) | : Daniel John Lloyd-Jones et al. | |

It is certified that error appears in the above-identified patent and that said Letters Patent is hereby corrected as shown below:

COVER PAGE:
(*) Notice: "727 days." should read -- 393 days. --

(56) References Cited, OTHER PUBLICATIONS (page two), "Colloquim" should read -- Colloquium --.

COLUMN 1:
Line 14, "it's" should read -- its --.

COLUMN 3:
Line 15, "132 Each" should read -- 132. Each --; and
Line 58, "view Associated" should read -- view. Associated --.

COLUMN 4:
Line 37, "Magnified" should read -- Magnifies --.

COLUMN 5:
Line 66, "428 The" should read -- 428. The --.

COLUMN 6:
Line 6, ""trough " should read -- "through --; and
Line 11, "second" should read -- seconds --.

COLUMN 7:
Line 52, "sub functions" should read -- sub-functions --.

UNITED STATES PATENT AND TRADEMARK OFFICE
CERTIFICATE OF CORRECTION

PATENT NO. : 7,073,128 B2
APPLICATION NO. : 09/769468
DATED : July 4, 2006
INVENTOR(S) : Daniel John Lloyd-Jones et al.

It is certified that error appears in the above-identified patent and that said Letters Patent is hereby corrected as shown below:

COLUMN 8:
Line 59, "parent only-mode," should read -- parent-only mode, --.

Signed and Sealed this

Twenty-first Day of August, 2007

JON W. DUDAS
*Director of the United States Patent and Trademark Office*